May 6, 1930.  W. C. McCOY  1,757,131
PISTON
Filed Nov. 19, 1927  2 Sheets-Sheet 1

INVENTOR
William C. McCoy.
BY Evans & McCoy,
ATTORNEYS

May 6, 1930. W. C. McCOY 1,757,131
PISTON
Filed Nov. 19, 1927   2 Sheets-Sheet 2

INVENTOR
William C. McCoy.
BY Evans & Wiley
ATTORNEYS

Patented May 6, 1930

1,757,131

UNITED STATES PATENT OFFICE

WILLIAM C. McCOY, OF SHAKER HEIGHTS, OHIO, ASSIGNOR TO THE CLEVELAND TRUST COMPANY, OF CLEVELAND, OHIO, A CORPORATION OF OHIO

PISTON

Application filed November 19, 1927. Serial No. 234,398.

This invention relates to pistons for internal combustion engines and particularly to aluminum alloy pistons.

One of the objects of the invention is to provide an improved form of internal combustion engine piston that has a bearing ring of different material from the material of the body of the piston and wherein the body of the piston is adapted to expand or contract independently of the bearing ring.

Another object of the invention is to provide a relatively inexpensive close fitting aluminum alloy piston.

An additional object of the invention is to provide a close fitting bearing ring for the piston that is disposed in the piston head and a second bearing ring that so controls the expansibility of the bottom of the piston skirt as to provide bearing surfaces for the piston body that are longitudinally well spaced on one side of the piston without undesirable frictional engagement with the cylinder wall.

A further object of the invention is to provide a bearing ring of the above designated character that is so mounted on the skirt of the piston as to utilize the inherent resiliency of the piston skirt to hold the ring in tensioned condition.

An additional object of the invention is to provide a piston in which one lateral face of the piston body on the side of the piston receiving the greatest component of side thrust serves as a bearing face during the explosion stroke and only a part of the body of the piston on the other working face serves as a bearing during the compression stroke, without exerting expansible pressures against the cylinder wall. The upper portion of the piston body on the compression thrust side is relieved in the zone above the bosses a sufficient degree to enable the upper bearing ring to receive the compression thrust on that side of the piston body.

An additional object of the invention is to provide a piston of aluminum alloy body that shall have a supplemental bearing part closely fitting the cylinder wall in the zone of the packing rings and wherein the piston skirt adjacent the open end thereof shall also closely fit the cylinder wall to substantially prevent movement of the packing rings in the piston head.

Another object of the invention is to provide a piston having a close fitting bearing surface intermediate the packing rings of the piston head and a second bearing surface adjacent the open end of the skirt, each bearing surface being of substantially constant circumferential dimension.

A further object of the invention is to provide a piston of aluminum alloy having supplemental bearing rings of different material from the body wherein the number of machining operations necessary to properly finish the piston are greatly reduced.

Another object of the invention is to provide a piston structure wherein the manufacturing tolerances are relatively large, thereby reducing the expense of installing the piston.

Selected embodiments of the invention are illustrated in the accompanying drawings wherein Figure 1 is a side elevational view of a piston constructed in accordance with the invention;

Figure 2:
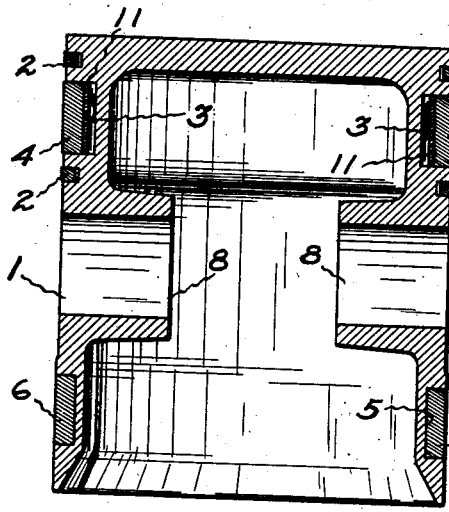
Fig. 2 is a transverse sectional view, taken substantially through the axis of the wrist pin and along line 2—2 of Fig. 1.

Pistons of aluminum alloy have heretofore been proposed wherein the expansion of the skirt of the piston was controlled by steel members of various characters but such members have been cast integrally with the body of the piston or permanently secured thereto. In certain of these structures of the prior art, the piston body was substantially incompressible circumferentially, whereas in the other of the structures, the piston skirt was split longitudinally.

Other pistons have also been proposed heretofore wherein a transversely split cast iron bearing ring having both ends interlocked with the body of the piston was utilized in conjunction with a circumferentially incompressible piston body of aluminum alloy.

The present invention proposes, together with other elements, a piston body of aluminum alloy that has limited expansibility as determined by the material of the restraining ring and that is also capable of being compressed by pressure from the cylinder wall, the compressive cylinder wall pressure acting on the aluminum body being limited in degree by the bearing face of the restraining ring which is solidly seated in a groove in the piston body to thereby substantially prevent undesirable cylinder wall friction and scuffing of the aluminum body through pressure of the piston body against the wall of the engine cylinder. The cylinder wall is also worn smooth by the material of the wear ring in applicant's device which is preferably sufficiently hard to polish the cylinder wall and prevent rapid wear of the aluminum body now commonly caused by irregularities or roughness in the ground cylinder wall without sacrificing the bearing qualities of the aluminum alloy piston body thus insuring a close fitting piston of greatly prolonged life.

The present invention also proposes an inexpensive piston structure that has an improved form of close fitting bearing surface of limited thermal expansibility at or near each extremity of the piston body without undesirable cylinder wall friction and in a simplified and inexpensive piston structure.

The piston shown in Figs. 1, 2, 3 and 4 of the accompanying drawings comprises a piston body 1 of suitable aluminum alloy that has packing rings 2 of conventional character mounted therein. The piston body also has a relatively deep ring groove 3 formed adjacent the packing ring grooves for receiving a bearing ring 4. A groove 5, that is formed in the body of the piston adjacent the open end of the skirt, is adapted to receive a restraining or control ring 6 that also constitutes a bearing ring for the piston skirt in certain embodiments of the invention.

The restraining ring 6 or lower bearing ring is seated in the bottom of the groove 5 without an interposed spring ring, sufficient outward spring pressure being obtained by slitting the skirt longitudinally from the open end of the skirt to the zone of the bosses as indicated by the slits 7. Any desired number or character of such slits may be formed in order to obtain the desired degree of spring in the skirt. The restraining ring 6 is of substantially the same construction as the ring 4, also having its ends interlocked in the same manner as the ring 4, the ring 6 being tensioned to the desired degree by the resilient expansibility of the skirt.

The piston body is relieved over the upper portion of one lateral face and well beyond each of the wrist pin bosses 8, the outline of the relief thus described being defined by the line 9 that extends around the edge of the relief. The relief of the area 10 of the piston defined by the line 9 is either cast or machined into the piston body a sufficient degree to permit the relieved portion of the piston body to thermally expand within the cylinder without excessive pressure against the cylinder wall under the most severe operating conditions.

Figure 3:
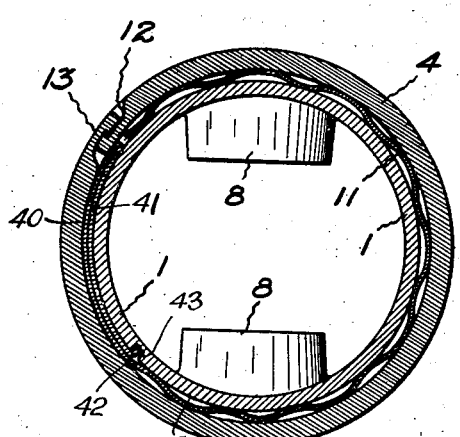
Fig. 3 is a transverse sectional view taken substantially on line 3—3 of Fig. 1 showing the detailed mounting of the upper bearing ring.
Figure 4:
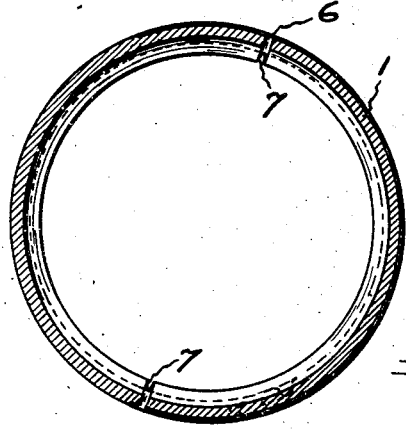
Fig. 4 is a transverse sectional view taken substantially on line 4—4 of Fig. 1 looking in the direction of the arrows and showing the construction of the lower bearing ring and its mounting on the piston skirt.

The groove 3 for receiving the bearing ring 4 is of substantially uniform depth around the entire circumference of the piston and may be either machined or cast into the piston body. If, however, the bearing ring 4 is also to function in part as an oil ring or as a packing ring, a close machine fit of the ring in the groove is desired. A wave ring 11 that is formed of relatively stiff spring steel, so called Swedish steel, or other suitable metal presses the ring 4 outwardly with sufficient force to prevent any substantial lateral shifting of the piston body within the bearing ring during the compression stroke of the motor. The wave ring 11 extends substantially around the entire circumference of the piston in this embodiment of the invention. The two ends of the wave or spring ring do not abut, however, because of the necessity of accommodating the thermal expansion of the piston body within the bearing ring 4 which is tensioned against the wave ring. As shown in Figure 3, the end 40 of the wave ring 11 is flattened out and bent back upon itself at 41, terminating in an inwardly extending flange 42 which extends into a pocket or recess 43 provided in the bottom of the ring groove 3 adjacent to or in the zone of the explosion thrust side of the piston. The flattened end 40 and bent back portion 41 provides a rigid connection between the bearing ring 4 and the piston body on the explosion thrust side of the piston. The flanged end 42 of the bent back portion 41 prevents circumferential movement of the wave ring 11 in the groove 3.

The bearing ring 4 may in some instances be formed of cast iron of a character suitable for piston rings of conventional character or it may be formed of steel alloys such as nickel steel, tungsten steel or other steel alloy having a relatively low or negligible coefficient of thermal expansion. The ring 4 should preferably have materially less coefficient of thermal expansion than the cylinder wall. The opposed ends 12 and 13 of the ring 4 interlock to limit the expansion of the bearing ring while permitting slight compression of the ring from cylinder wall pressure before the piston will seize in the cylinder. The ring normally has sufficient mechanical clearance in the engine cylinder to accommodate the oil film between the cylinder wall and the piston. By making the bearing ring 4 of a material having a somewhat lesser coefficient of thermal expansion than the cylinder wall, a bearing ring is obtained that will substantially maintain a constant clearance within the cylinder. A ring material of lesser coefficient of thermal expansion than the cylinder material is desired because of the higher temperature at which the ring normally operates.

The bearing ring 4 is mounted in place by placing it over the wave ring after which it is compressed around the wave ring until the ends interlock. The tension in the ring and the undercut character of the interlock maintain the ends of the ring in their interlocked condition. The spring wave ring 11 is compressed a sufficient degree by the bearing ring to prevent lateral movement of the piston body within the bearing ring and to provide a sufficiently rigid backing for the bearing ring to permit the machining or grinding of the ring after it is mounted on the piston body.

The extent of the relieved area may vary considerably although it is desirable in all cases that it extend below the piston bosses and include the zone of the skirt wherein the boss is disposed. It is usually unnecessary to relieve the circumferentially compressible or controlled portion of the piston skirt.

The piston is preferably manufactured by casting in the relieved area of the piston body and the grooves 3 and 5. The longitudinal slits are sawed or otherwise formed in the skirt. Since the tension on the bearing ring 4 is sufficient to prevent substantial movement of the ring in the groove, and since the groove 3 does not open into the interior of the piston skirt, close machine fit of the ring within the groove is unnecessary, unless it is desired that the ring function as an oil ring, and a groove formed by casting the piston body in a permanent mold as conventionally practiced is generally sufficient. The bearing ring 4 and the restraining ring 6 are next mounted on the piston body as heretofore described with their ends interlocked. The piston is then machined and ground to proper size. Both the body, the bearing ring, and the restraining ring are ground to size during the same operation. Any suitable supporting mandrel may be used inside the open end of the skirt or not as conditions require. The tension of the skirt imposed by the restraining ring will normally provide adequate support for the split end of the piston skirt during machining and grinding operations.

The grooves for the packing rings 2 are also formed in the piston head during the machining operation. It will, therefore, be seen that the machining of the piston requires only one setting for its completion and that the bearing faces on the bearing and restraining rings and on the piston body are ground in assembled position. The bearing face adjacent the ring 4 may be ground to a slightly less diameter than the bearing ring.

Figure 5:
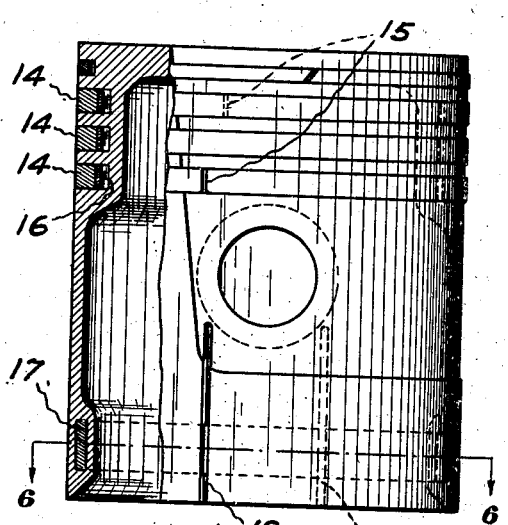
Fig. 5 is a side elevational view, shown partially in longitudinal section with parts broken away, of a modified embodiment of the invention.
Figure 6:
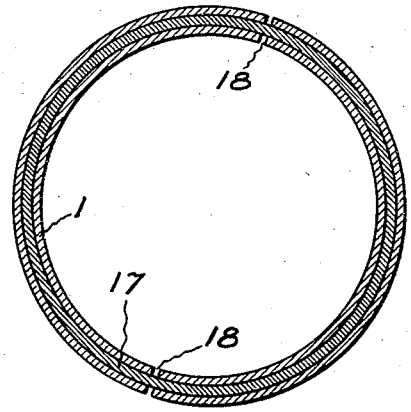
Fig. 6 is a transverse sectional view looking in the direction of the arrows 6—6 of Fig. 5.

The modified embodiment of the invention shown in Fig. 5 and Fig. 6 is particularly useful where it is desired that the bearing ring also function as a packing ring. The bearing rings 14 of this embodiment of the invention are individually of the same structure as the bearing ring 4 except that they are narrower. Each bearing ring 14 is transversely split and its ends are interlocked as indicated at 15 on the drawing. The form of interlock is preferably of the same character as the interlock for the ends of the ring 4. A narrow spring ring 16 is used with each bearing ring 14 in lieu of the wider spring ring 7.

The restraining ring 17 of this embodiment of the invention is preferably formed of polished steel that is cast integrally with the body of the piston and extends through the slits 18 cast in the skirt in order that it will control the circumferential size of the piston skirt. This form of skirt control ring is shown to emphasize the fact that other conventional piston bodies having a close fitting bearing surface adjacent the open end of the skirt may be used in association with the bearing ring herein proposed without departing from the invention although the improved form of skirt controlling and yielding piston body shown in the drawings is preferred.

Fig. 7, Fig. 8, Fig. 9 and Fig. 10 illustrate a particularly light weight form of piston embodying the invention. In this form of piston, the bearing and the skirt control rings 20 and 21 are preferably formed of strip steel, either of invar or other desired steel, having a relatively low coefficient of expansion. The specific form of interlock provided for each of the steel rings is the same and is shown in detail in Figs. 9 and 10. The end portion 22 of the ring has a window or aperture 23 formed therein. The other end portion 24 of the ring has a tongue 25 pressed from the body thereof and provided with an inclined face adapted to engage the inclined face 26 of the end portion 22 of the ring. The end portion 22 of the ring underlying the other end portion 24 is depressed the thickness of the tongue 25 in order to present a cylindrical surface on the outside of the ring.

The rings may be made from strip material that is punched in the desired manner with the engaging face of the tongue 25 inclined in the same direction and to substantially the same degree as the inclined face 26 of the interlocking end portion of the window. The strip of material, after being thus formed is made circular so that it will fit around the piston and the ring is given the desired temper. The ring is placed on the piston in substantially the same manner as in the preceding form of cast metal ring. If desired, the ends of the ring may be riveted or spot welded together instead of being interlocked as shown.

Figure 11:
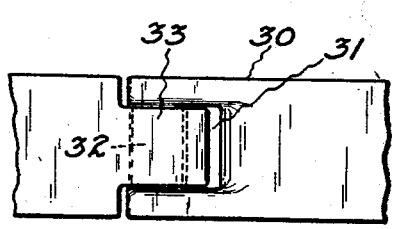
Fig. 11 is an enlarged side elevational view of the interlocking end portions of a bearing ring showing a modified form of interlock for the bearing ring adapted for use with any of the piston types shown in the application.
Figure 12:
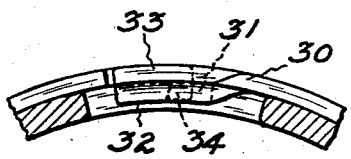
Fig. 12 is an edge elevational view of the bearing ring portions shown in Fig. 11.

In the alternative form of steel ring shown in Figs. 11 and 12, the end portion 30 of the ring has a window 31 formed therein. The portion 32 of the body of the ring between the window and the end of the ring is depressed substantially the thickness of the thickness of the interlocking tongue 33 in order that the outer face of the ring will be substantially cylindrical over the interlock. The tongue 33 is preferably about one-half the width of the ring body and it has its end portion 34 bent inwardly to provide a hook or interlocking portion for securely locking the ends of the ring together.

During operation, a piston of the character disclosed will bear on one face of the piston including the bearing rings where they are mounted on the outside of the piston during the working stroke. The other side of the piston, which is forced in the direction of the cylinder walls solely by the component of side thrust from the compression in the explosive chamber, bears on the upper bearing ring and on the unrelieved body portion of the lower end of the piston, including the bearing ring where a surface ring is used. It will, therefore, be seen that a very small clearance is maintained in the zone of the packing rings of the piston that prevents substantial movement of the packing rings in the piston head since the bottom of the piston closely fits the cylinder and the top of the cylinder also has a close fitting bearing ring in the head of the piston. It is desired that a minimum number of packing rings be used because of the friction that is produced by a packing ring engaging the cylinder wall. The bearing ring is so close a fit to the cylinder that it will serve in part as a packing ring although its size is not controlled by pressure engagement with the cylinder wall.

Figure 1:
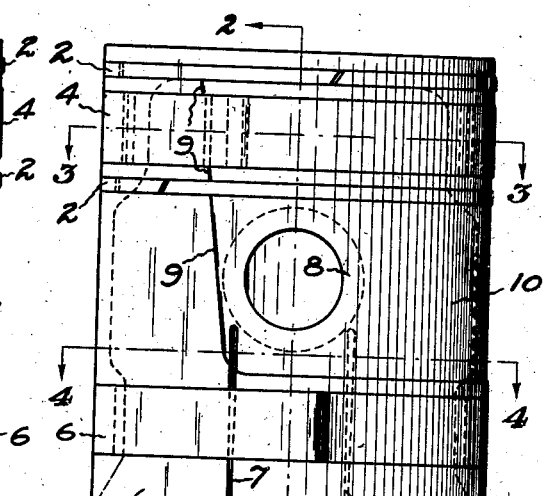
Figure 7:
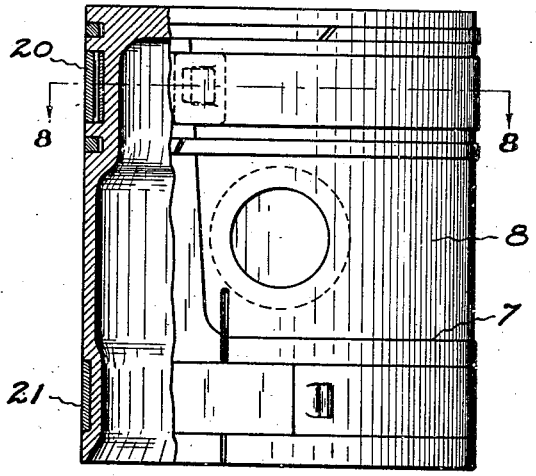
Fig. 7 is a side elevational view, shown partially in longitudinal section with parts broken away, illustrating a modified embodiment of the invention wherein an improved bearing ring is utilized.
Figure 8:
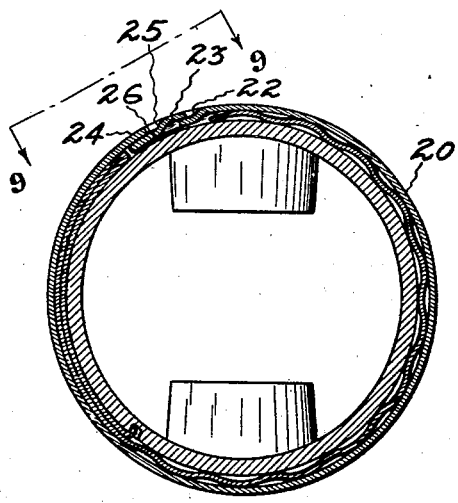
Fig. 8 is a transverse cross sectional view of the piston shown in Fig. 7 taken substantially on line 8—8 thereof.
Figure 9:
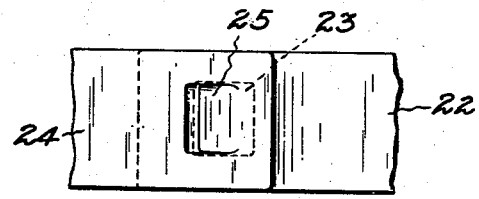
Fig. 9 is an enlarged side elevational view of the interlocking end portions of the bearing ring shown in Figs. 7 and 8.
Figure 10:
Fig. 10 is a corresponding enlarged edge view of the bearing ring portion shown in Fig. 9.

In the form of piston shown in Figs. 1 and 7 in which a plurality of separate bearing rings are used that are either alternated with or mounted adjacent the packing rings, the bearing rings provide a distributed bearing surface and also compensate for irregularities in the cylinder walls.

Although I have described only a few applications of the principles of the invention, it is obvious that other structures may be formed by slight modifications of the invention and principles herein disclosed and I desire therefore that only such limitations shall be applied as are set forth in the accompanying claims.

What I claim is:

1. A piston comprising a relatively highly expansive body portion, a bearing ring groove in the head portion thereof, a bearing ring having its ends interlocked against separation, a relatively stiff wave ring mounted between the body of the piston and the bearing ring, the working thrust face of the piston being ground to substantially the same radius as the bearing ring, said piston body being relieved from a point adjacent one boss, completely past the boss, around the other working face of the piston, and past the other boss in the zone of the bearing ring to a point below the boss, and an inextensible control ring adjacent the open end of the skirt adapted to control the circumferential dimension of the skirt in accordance with the temperature coefficient of expansion of said control ring, said control ring being seated in a groove in the piston skirt of no greater depth than the thickness of the control ring and said control ring being transversely split and having its ends interlocked.

2. A piston comprising a relatively highly expansive body portion, a bearing ring groove in the head portion thereof, a bearing ring having its ends interlocked against separation, a relatively stiff wave ring mounted between the body of the piston and the bearing ring, the working thrust face of the piston being ground to substantially the same radius as the bearing ring, said piston body being relieved from a point adjacent one boss, completely past the boss, around the other working face of the piston, and past the other boss in the zone of the bearing ring to a point below the boss, and an inextensible control ring adjacent the open end of the skirt adapted to control the circumferential dimension of the skirt in accordance with the temperature coefficient of expansion of said control ring.

3. A piston comprising a relatively highly expansive body portion, a bearing ring in the head thereof having its ends interlocked against separation, the working thrust face of said body portion being relieved from a point adjacent one wrist pin boss completely past the boss, around the other working face, and past the other boss in the zone of the bearing ring to a point below the boss, and an inextensible control ring adjacent to the open end of the piston skirt capable of controlling the circumferential dimension of the skirt in accordance with the temperature coefficient of expansion of said control ring.

4. A piston comprising a relatively highly expansive body portion, a bearing ring groove in the head thereof, a bearing ring positioned in said groove having a relatively low coefficient of thermal expansion, the explosion thrust face of said body portion being of substantially the same radius as said bearing ring, and the lower circumferential surface of said body below the bosses thereof being of substantially the same radius as said bearing ring to provide a circumferential bearing surface adjacent to the open end of the piston skirt continuous with said exposed thrust face and spaced from said bearing ring on the working face of said piston body opposite said explosion thrust face, and an inextensible control ring of relatively low coefficient of thermal expansion mounted in said bearing surface for controlling the circumferential dimension of said skirt bearing surface in accordance with the temperature coefficient of expansion of said control ring.

5. A piston comprising a relatively highly expansive body portion, a bearing ring groove in the head thereof, a bearing ring formed of a metal having a relatively low coefficient of thermal expansion, positioned in said groove, and a relatively stiff wave ring mounted between said bearing ring and the bottom of said groove having an end thereof bent back upon itself to provide a rigid connection between said bearing ring and the explosion thrust side of said piston.

6. A piston comprising a relatively highly expansive body portion, a bearing ring groove in the head thereof, a bearing ring having a relatively low coefficient of thermal expansion positioned in said groove, and a relatively stiff band mounted between said bearing ring and the bottom of said groove, one end of said band being bent back upon itself to form a rigid connection between said bearing ring and the explosion thrust side of said piston, the remainder of said band being waved to form a resilient connection between the remainder of said groove bottom and said ring.

7. A piston comprising a relatively highly expansive body portion, a bearing ring groove in the piston head having a recess in the bottom thereof adjacent to the explosion thrust face of said body portion, a bearing ring having a relatively low coefficient of thermal expansion positioned in said groove, and a relatively stiff wave ring interposed between said bearing ring and the bottom of said groove, one end of said wave ring being curvilinear and bent back upon itself to form a rigid connection between said bearing ring and the explosion thrust side of said piston, and the extreme end of said bent back portion being flanged radially inwardly to extend into said recess in the bottom of said bearing ring groove.

In testimony whereof I affix my signature.
WILLIAM C. McCOY.